United States Patent [19]

Imam et al.

[11] Patent Number: 4,984,173
[45] Date of Patent: Jan. 8, 1991

[54] SYSTEM FOR ALIGNING A ROTATING LINE-SHAFT

[75] Inventors: Imdad Imam, Schenectady, N.Y.; Gerald J. Carlson, Greenfield Township, Milwaukee County, Wis.

[73] Assignee: General Electric Company, Schenectady, N.Y.

[21] Appl. No.: 363,841

[22] Filed: Jun. 9, 1989

[51] Int. Cl.$^5$ .............................................. G06F 15/00
[52] U.S. Cl. .................................. 364/508; 364/565; 73/660; 73/593
[58] Field of Search ................... 364/508, 565; 73/457, 73/459, 462, 476, 593, 517 AV, 660

[56] References Cited

U.S. PATENT DOCUMENTS

| | | | |
|---|---|---|---|
| 4,170,896 | 10/1979 | Korkosz | 73/462 |
| 4,310,892 | 1/1982 | Himmler | 73/462 |
| 4,453,407 | 6/1984 | Sato et al. | 73/462 |
| 4,478,082 | 10/1984 | Sato et al. | 73/593 |
| 4,571,657 | 6/1988 | Imam et al. | 364/508 |
| 4,626,147 | 12/1986 | Nystuen et al. | 364/508 |
| 4,872,342 | 10/1989 | Hanson et al. | 73/517 AV |
| 4,941,105 | 7/1990 | Marangoni | 364/506 |

OTHER PUBLICATIONS

Remillard J. "Data Management System for Predictive Maintenance Programs"; Sound & Vibration Sep. 1985.

*Primary Examiner*—Parshotam S. Lall
*Assistant Examiner*—Ellis B. Ramirez
*Attorney, Agent, or Firm*—John S. Beulick; James C. Davis, Jr.; Paul R. Webb, II

[57] ABSTRACT

Each bearing of an aligned line-shaft has vibration responses which differ from the vibration responses of a misaligned system in which at least one of the bearings is statically displaced. Computed static displacement values for each bearing are derived from the equation of motion of the system employing mass, stiffness and damping coefficients of the system. The static displacement value of each bearing is computed from the vibration responses of all of the bearings. Accelerometers sense the vibration response of each bearing. A computer computes the magnitude of misalignment of each bearing from the sensed responses. The computed results provide an indication of the magnitude of static displacement of each bearing of the system causing the sensed vibration response.

12 Claims, 6 Drawing Sheets

SYSTEM FOR ALIGNING A ROTATING LINE-SHAFT

This invention relates to a system for dynamically measuring the misalignment of a line-shaft.

While the present invention is described in an embodiment for aligning a line-shaft in large ships, the invention is adaptable to more general line-shaft systems. In large ships, alignment of the propeller drive line-shaft is important for smooth running of the shaft-bearing system and to prolong the life of bearings and gears. The line-shaft is normally supported by a number of spaced bearings. The shaft drives a propeller at one end and is driven by a turbine via a gear box assembly at the other end. The line-shaft system is normally aligned when the ship is manufactured, however, the system may later become misaligned due to the forces acting on the ship while the ship is in service. Such forces may result in warping of the line-shaft supporting structure, for example, or the misalignment may be due to degradation of the various supporting structures. Should the line-shaft bearings shift relatively small magnitudes, for example, a few thousandths of an inch, costly deterioration of the drive gear system can occur. The resultant misalignment of the line-shaft can also cause excessive vibration causing premature wear of the bearings.

FIG. 1 of the drawing illustrates a typical line-shaft arrangement in which the load 12, in one example, represents a propeller driven by a turbine 10. The load 12 is driven by turbine 10 via line-shaft 14 and gear reduction system 16. The line-shaft 14 is supported by a plurality of spaced bearings 18, 19, 20, 21, and so forth. The bearings are supported on a support structure or pedestals represented by symbols 22. Turbine 10 and gear system 16 are also supported on a support structure, symbols 22. Normally, when the shaft is initially installed in a ship, the bearings 18-21 inclusive, are all aligned and the rotating axis 24 of the shaft is linear. However, during prolonged operation as a result of the factors discussed above, any one or more of the bearings 18-21 may displace in the vertical directions 26 (or horizontal directions normal to the plane of the drawing sheet). A displacement of a few mils (1 mil=0.001 inch) of one or more of the bearings can cause significant vibrations in the bearings and significant damage to the gears of system 16. Prior art alignment of the shaft 14 requires the ship to be taken into port and out of service, and the drive system stopped.

In FIG. 2, the shaft 14 is supported by a plurality of bearings $B_1, B_2, \ldots B_n$ corresponding to bearings 18-21, FIG. 1. Forces $W_1, W_2, \ldots W_m$ are on the stationary shaft. These forces include the shaft weight, considered to be lumped at points along the shaft, and any externally applied forces. To measure the misalignment of the shaft 14 at various ones of the bearings $B_1 \ldots B_n$, in the prior art, strain gauges 28, 29, 30 and so on are placed on the shaft. As shown, two strain gauges 28 and 29 are located between bearings $B_2$ and $B_3$ and one strain gauge, for example, gauges 30, 31, and 32 are mounted between each of the other sets of the bearings except between bearings $B_1$ and $B_2$.

The strain information is then used in an analytical model to calculate the bearing reactions, which reactions are used to calculate the amount of shimming required at each of the bearing pedestals to realign the system. This approach is relatively costly, time consuming and causes a given ship during such testing to become inoperational. An additional disadvantage is that this alignment must be performed under static conditions, i.e. the strains are measured while the shaft is at rest. These strains are used to find the moment in the line-shaft at the location along the shaft at each strain gauge.

Once the moment in the line-shaft is known between each set of the bearings, the bearing reactions are calculated, where, in FIG. 3, an imaginary cut is made in the shaft at the first strain gauge and the force $F_1$ and moment $M_1$ are added at the cut to provide static balancing. The moments are summed about the imaginary cut and using a similar process for an imaginary cut at the second strain gauge, a second summing of the moments is made. Reactions $R_1$ and $R_2$ are solved for using the equations of summed moments at the two strain gauges. An imaginary cut is made at the third strain gauge and the moments summed about the cut results in a third bearing reaction. This procedure is continued until all bearing reactions are found. The equations may also be put in matrix form and then solved simultaneously.

The flexibility matrix for the shaft is then formed. The shaft is divided into sections to form the matrix. There is a separate section of the shaft between each pair of bearings or wherever there is a substantial change in shaft cross-section. For each section, a constant circular cross-section is assumed and beam theory is used to calculate the stiffness of the shaft. The global stiffness matrix for the shaft is then assembled from the section stiffnesses. The stiffness matrix is inverted to provide a flexibility matrix for the shaft. Loading and displacements of the shaft are related through the flexibility matrix in accordance with known relationships. Since bearing reactions and loading are known, the bearing displacements can be calculated. For an aligned line-shaft, the misaligned displacements are made equal to the desired or designed displacements. The achieve this, the bearings then are shimmed a magnitude to achieve alignment according to the derived displacements calculated from the bearing reactions and flexibility matrix.

The resulting computed displacements of the bearings employing the above procedure, however, is based on a static analysis and does not take into consideration dynamic factors introduced by a rotating system. More importantly, because the static alignment system described above requires a ship to be taken out of service periodically to determine whether or not a shaft is sufficiently misaligned as to require realignment is discouraged by ship owners for economic reasons. This periodically results in misaligned shafts occurring during transition of a ship between ports and can result in serious damage to the drive system. Therefore, the alignment inspection periodicity is based on a compromise of the economics of removing the ship from service and the resulting costly damage to the ship should the shaft become misaligned during in-service transit. This compromise is the problem to which the present invention is directed and improves.

A system for determining the magnitude of static linear displacement of a rotating shaft from an aligned reference position at each respective one of a plurality of bearings supporting the shaft in accordance with the present invention wherein the shaft tends to vibrate differently due to the static linear displacement at at least one of the bearings comprises means for determining at each of the bearings the linear vibration amplitude of the shaft caused by the static linear displacement of the shaft from at least one of the reference positions. Means are responsive to the means for determining for producing an indication representing the magnitude of the static displacement of each of the bearings from the aligned reference position which displacement corresponds to and is the cause of the determined change in linear vibration amplitude at each of the bearings.

In the drawing:

FIG. 7a is a section of the bearing of FIG. 6c taken along lines 7a-7a;

Figure 1:
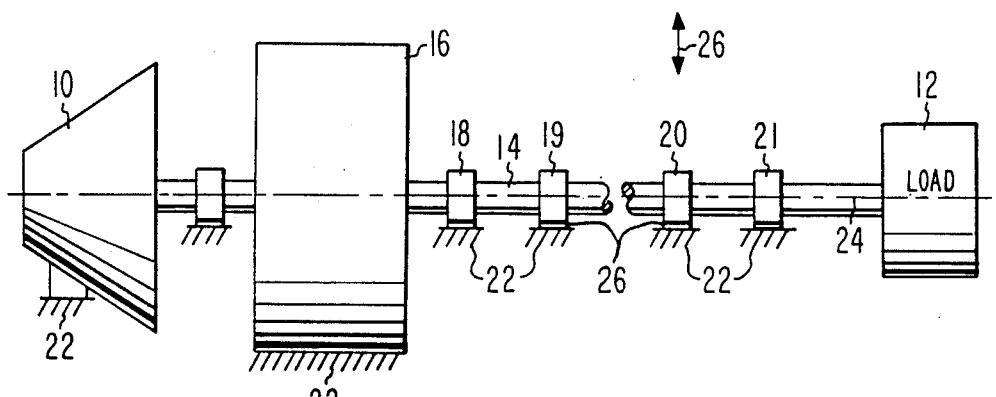
FIG. 1 is a schematic elevation diagrammatic view of a typical drive shaft system.
Figure 2:
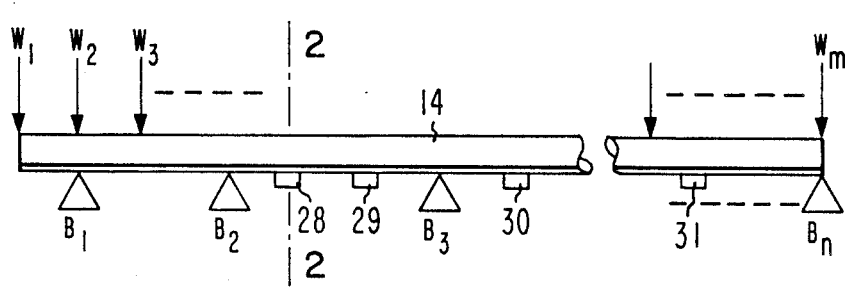
FIG. 2 is a schematic representation of loadings and bearing positions and strain gauges employed in prior art systems for statically measuring misalignment of the shaft of FIG. 1.
Figure 3:
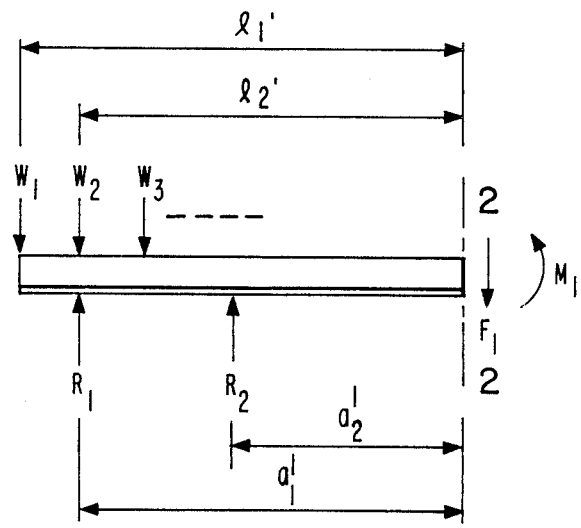
FIG. 3 is a force-moment reaction diagram for the shaft of FIG. 2 as employed in prior art misalignment measuring techniques.
Figure 4:
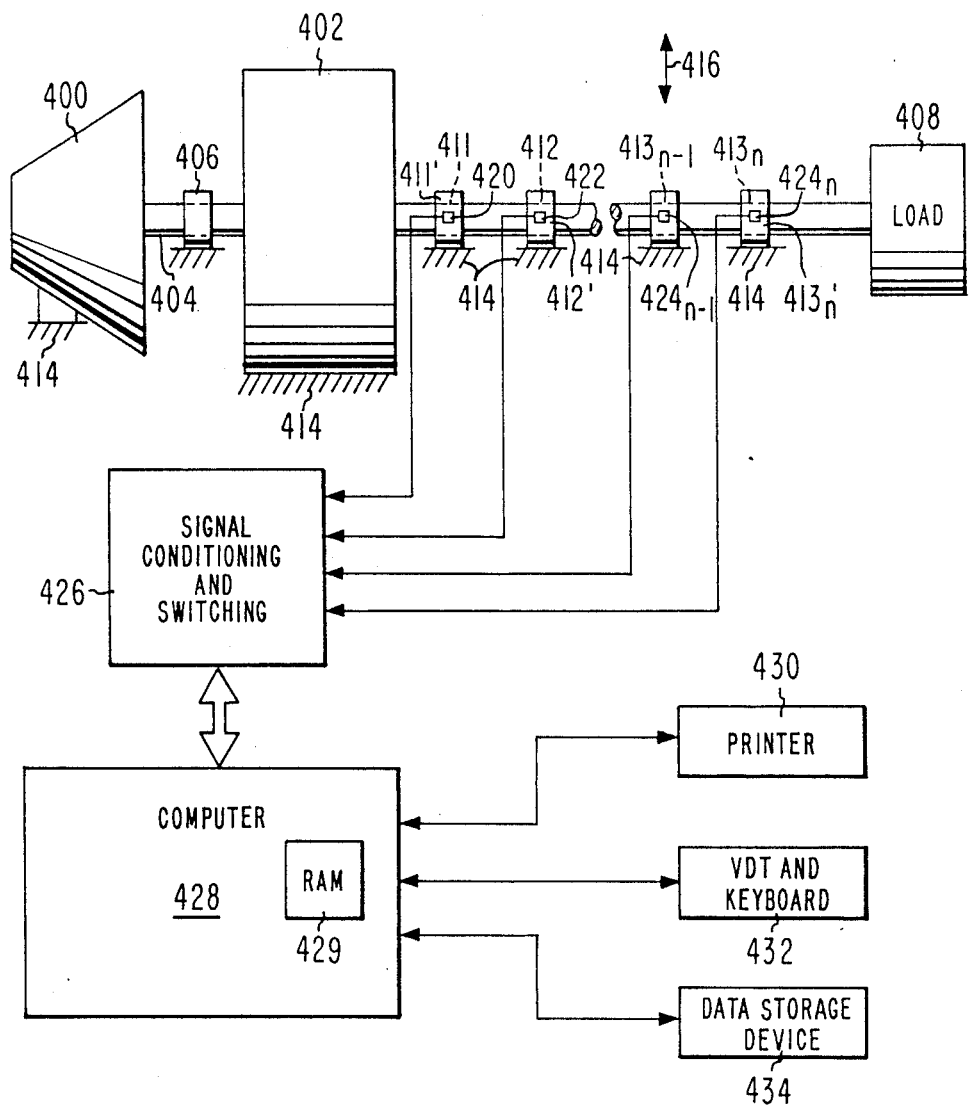
FIG. 4 is a system for dynamically measuring the misalignment of a rotating shaft in accordance with one embodiment of the present invention.
Figure 6A:
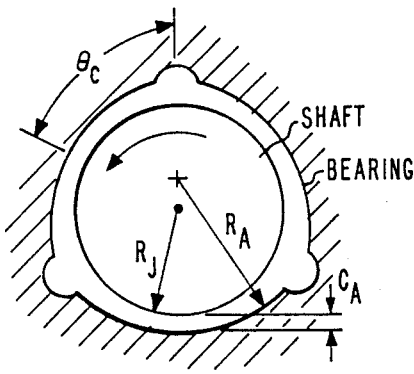
FIGS. 6a, 6b, 6c, 6d and 6e are front elevation views of some of the different kinds of bearings which may be employed in the line-shaft system of FIG. 4.
Figure 6C:
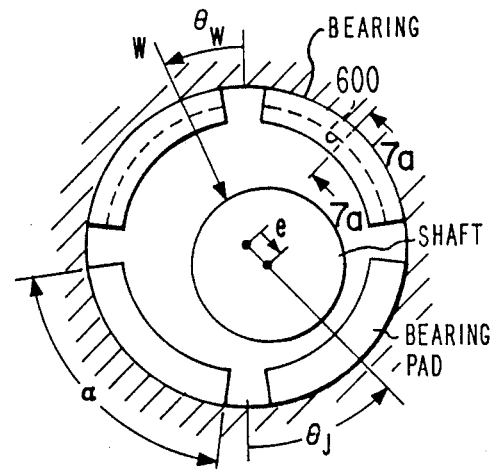
Figure 6B:
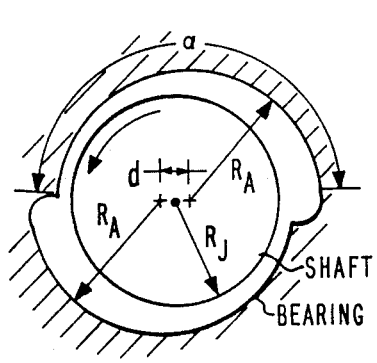
Figure 6D:
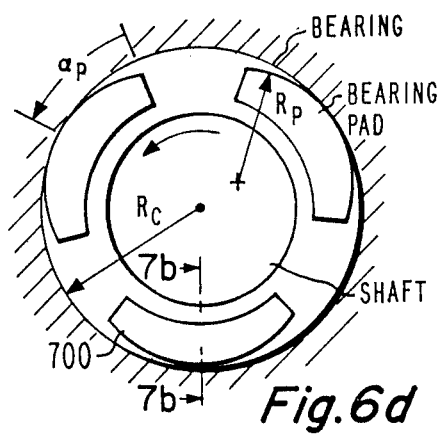
Figure 6E:
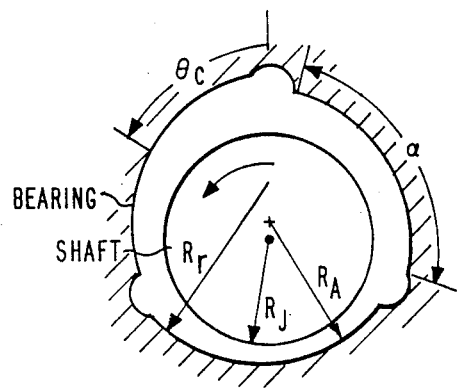
Figure 7A:
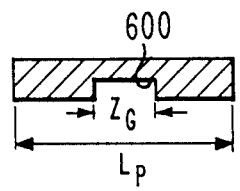
Figure 7B:
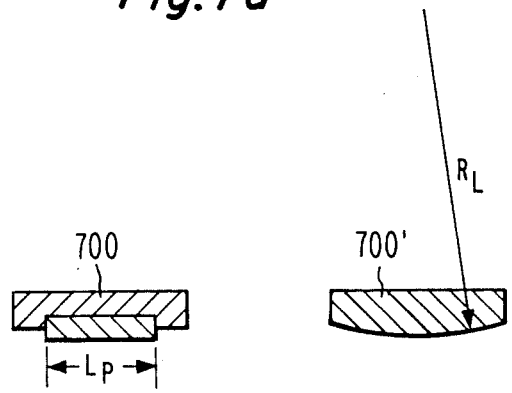
FIG. 7b is one elevation view of a bearing section of the bearing of FIG. 6d taken along line 7b-7b.
Figure 8:
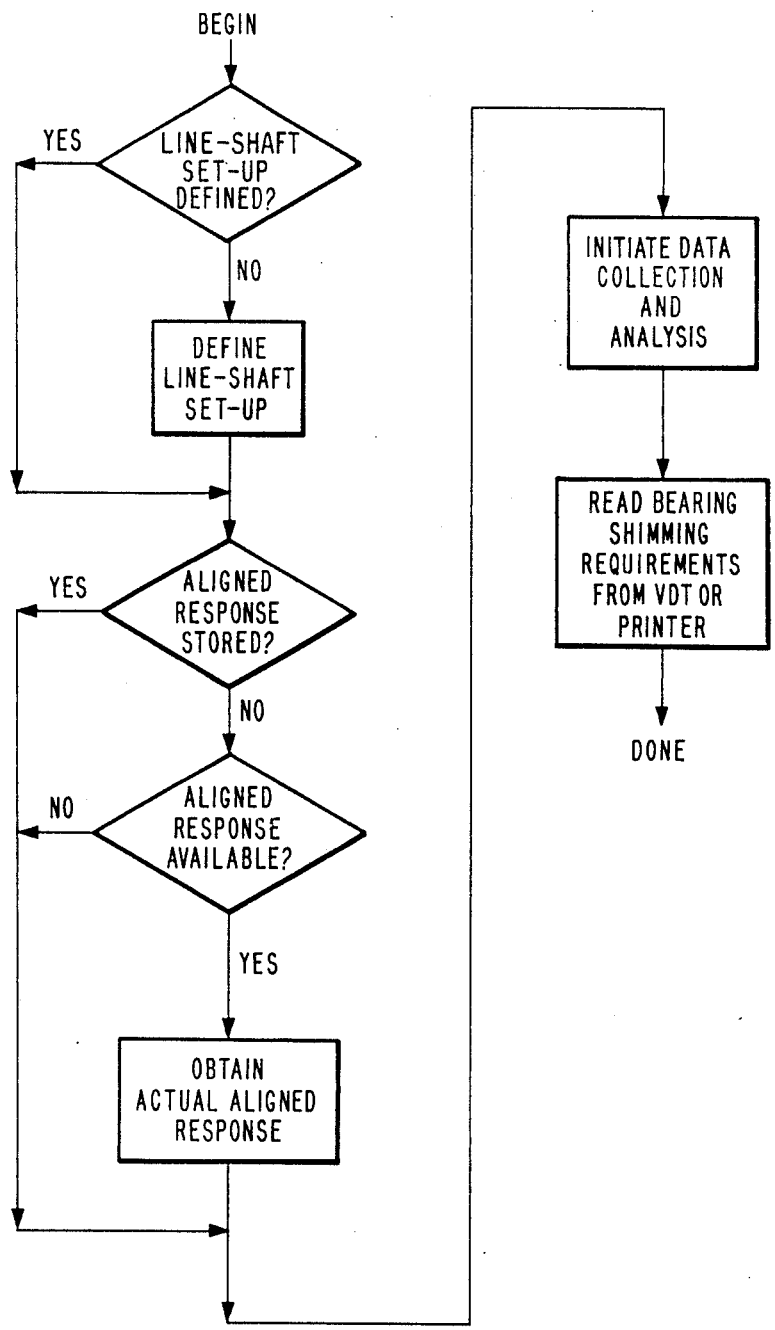
Figure 9:
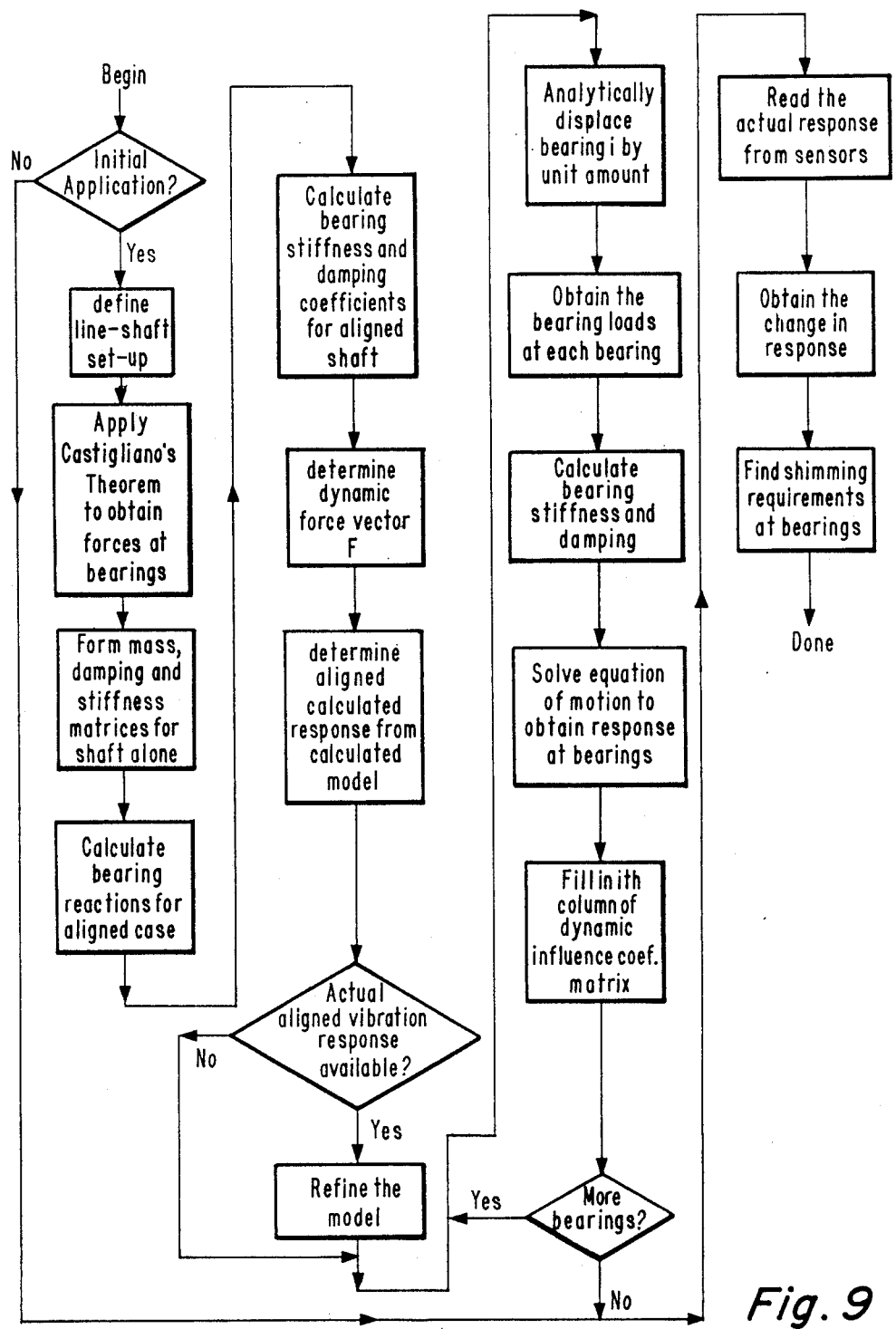

FIG. 7b' is a second elevation view of a bearing section of the bearing of FIG. 6d taken along lines 7b-7b showing an alternate configuration;

FIG. 8 is a general methodology flow chart for determining the bearing shimming requirements for a misaligned line-shaft employing the embodiment of FIG. 4; and FIG. 9 is a more detailed methodology flow chart for determining the shimming requirement for each misaligned bearing of the system of FIG. 4 in accordance with one embodiment of the present invention.

In FIG. 4, turbine 400, representative of one or more turbines, drives a gear reduction unit 402 via a drive shaft 404 supported on one or more bearings 406. Gear reduction unit 402 drives a load 408 which in this embodiment may be a propeller for a ship drive system via drive shaft 410. The shaft 410 is supported at a plurality of spaced locations by bearings 411, 412, . . . $413_{n-1}$, and $413_n$. The bearings $411$–$413_n$ are supported on pedestals $411'$, $412'$, . . . $413_n'$. The pedestals $411'$–$413_n'$ are supported on a support structure represented by symbols 414. The turbine 400 and gear reduction unit 402 are also supported on a support structure represented by symbols 414.

The system of the present invention as shown in FIG. 4, by way of example, permits measurement of the magnitude of misalignment of the shaft 410 while the shaft is rotating and in service. Therefore this system does not require that the shaft be stopped or the ship pulled out of service for a period of time for determining the shaft misalignment. Further, the dynamic measure of misalignment of the shaft 410 while the shaft 410 is rotating permits the user of the system to periodically monitor the magnitude of misalignment of the shaft 410. When the shaft is misaligned beyond a predetermined threshold, the system may be stopped for a relatively short time for reshimming those of the bearings $411$–$413_n$ which are identified by the present system as being misaligned to reposition the shaft into alignment.

The present invention relates to the concept that misalignment, that is physical displacement of any one or more of the bearings $411$–$413_n$ in the vertical directions 416 (or horizontal directions normal to directions 416) will cause a detectable change in the linear vibration response of the line-shaft system. By linear vibration response is meant the magnitude of the vibration amplitudes in a given linear direction, e.g., vertical, of the shaft-bearing-pedestal system.

If one or more of the bearings shifted in a vertical direction 416 (or horizontal direction) by a magnitude of, for example, several thousandths of an inch, the axis of rotation of the shaft is shifted. This shifting of one or more of the bearings is referred to herein as linear static displacement as distinguished from the linear vibration displacement discussed above. This shift in position may cause the entire bearing-rotating-shaft system to vibrate in a manner differently than the aligned-shaft system. That is, the magnitude of the bearing vibrations may increase and/or different bearings may vibrate differently in a misaligned system as compared to an aligned system. The vibrations have a given linear amplitude such that they provide a dynamic response which can be analytically modeled to correspond to a linear static displacement of one or more of the bearings in the directions of 416. The change in vibration response of each of the pedestals $411'$–$413_n'$ in a misaligned shaft from the known vibration response of the pedestals for an aligned shaft can be predicted by an analytical procedure to be described below. This change in dynamic response from the aligned case, being predictable, can be utilized in a computerized system which produces, in response to a measured vibration response, the actual linear static displacement experienced by one or more of the bearings. The amount of shimming of a given pedestal is equal and opposite in sense to that linear static displacement value which causes the measured change in vibration response of the bearing-shaft system. All of this will become clearer upon explanation of the embodiment of the present invention that follows.

In FIG. 4, each of a plurality of accelerometers 420, 422, $424_{n-1}$ and $424_n$ correspond to and are attached to a respective, different pedestal $411'$–$413_n'$. The accelerometers provide an output signal to a signal conditioning and switching system 426. The signals produced by the accelerometers represent the magnitude of the linear vibration amplitude of each of the bearing pedestals. The signal conditioning and switching system 426 provides those signals in the desired format for use by computer 428. Computer 428 includes a programmed microprocessor and RAM 429. The RAM 429 contains a matrix of data which corresponds to the measured vibration responses of the different accelerometers $420$–$424_n$. These responses are used to compute the linear static displacements of the bearing pedestals $411'$–$413_n'$ employing the matrix of data. The computer output is applied to a printer 430, a keyboard and video display terminal (VDT) 432 and to a data storage device 434 such as a magnetic disk for backup or placement in another computer system for readout, printing, and display. The printer 430 and VDT 432 display the actual shimming requirements for each displaced misaligned bearing pedestal in the shaft-bearing system.

Figure 5:
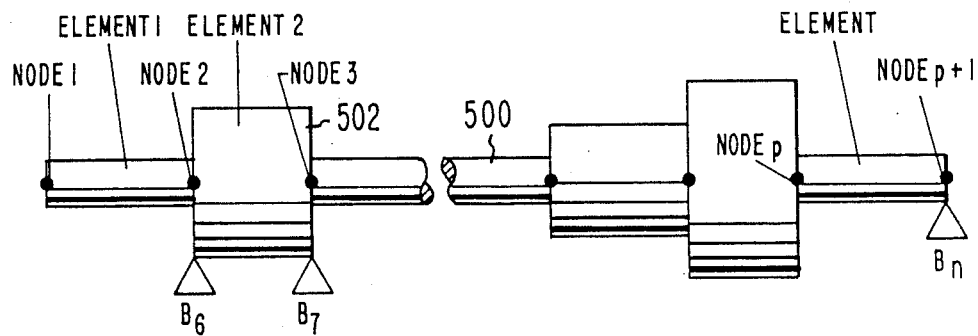
FIG. 5 is a diagram of the shaft of FIG. 4 schematically representing the sectional division of the shaft into nodes and elements for purpose of dynamic analysis.

In FIG. 5, the present system employs the finite element method (FEM) to analytically formulate an initial model of the shaft-bearing system. In this methodology, the aligned shaft 500 from the gear reduction unit 402 (FIG. 4) to the last bearing $B_n$ before the load is divided into elements. For example, element 1 represents one section of the shaft 500. Each element has two nodes, for example, element 1 has node 1 and node 2. Assuming the shaft has different cross-sectional areas, each different cross-sectional area of the shaft forms a separate element, e.g., element 2. Element 2 has two nodes, node 2 and node 3. Each node is at the end of that element. By way of example, node 2 is at one bearing $B_6$ while node 3 is at a second bearing $B_7$. The shaft is further divided into nodes and elements such that element P, the last element of the shaft, has a node p and a node p+1. Node p+1 is supported by bearing $B_n$. In developing this analytical model, a new element is chosen wherever the line-shaft has a significant change in cross-section or wherever there is a bearing. A bearing therefore always lies at a node. This model is representative and illustrative rather than limiting. One of ordinary skill in the finite element analysis methodology should be able to divide a line-shaft bearing system into a number of elements and nodes as described.

In forming the FEM analytical model there are a number of different kinds of information required. This information includes the number of bearings, the bearing properties, the bearing and shaft material properties, the rotational shaft speed, and so on for the bearing-shaft system. Some of these properties further include, for example, for each shaft section, a shaft outer diameter, inner diameter, shaft length, Young's modulous of elasticity for the shaft material and the material density for the shaft section in the surrounding medium. For each unbalance in the shaft-bearing system the weight of the unbalance should be provided as well as the location of unbalance along the shaft, the angular location of the unbalance in degrees, and the radial location of unbalance, the eccentricity, in units of length. For each bearing, the diameter of the bearing should be given, the length of the bearing, the operating temperature bearing oil viscosity, the machined radial clearance for a bearing, the assembled radial clearance for each bearing, and the bearing type, whether it is fixed arc, tilting pad and so on, as will be described.

In FIG. 6a a fixed arc bearing is illustrated. Table I includes the definition of the various parameters of a fixed arc bearing shown in FIG. 6a. These parameters are self-explanatory.

TABLE I

| | | |
|---|---|---|
| $\Theta_C$ | = | Angular location of the center of the first bearing arc |
| $R_A$-$R_J$ | = | Machined radial clearance |
| $C_A$ | = | Assembled radial clearance |
| $\Theta_W$ | = | Load angle |
| $\alpha$ | = | Arc or pad length |
| $\Theta_J$ | = | Journal angle |
| e | = | Journal eccentricity |
| $Z_G$ | = | Axial length of overshot groove |
| L | = | Bearing length |
| $\alpha_P/\alpha$ | = | Pivot position |
| $R_P$ | = | Circumferential radius of pivot |
| $R_L$ | | Axial radius of pivot |
| $L_P$ | = | Axial length of pad support |
| $R_C$ | | Casing radius |
| $R_A$ | = | Radius arc |
| $R_J$ | = | Radius Journal |
| $R_A$-d-$R_J$ | = | Assembled radial clearance |
| $R_T$ | | Radius arc in taper region |
| $R_T$-$R_J$ | = | Taper radial clearance |

For each fixed arc bearing the information required is whether the bearing is a tri-tapered bearing. A tri-tapered bearing is illustrated in FIG. 6d. The parameters of a tri-tapered bearing are listed in Table I. If the bearing is an offset arc bearing such as illustrated in FIG. 6b, then this information is utilized. The parameters for an offset arc bearing are also given in Table I. For each bearing, the angular arc length is information which is required where all arcs are assumed to have an equal arc length in degrees in a given bearing. The angular position of the center of the first arc in degrees is information which is utilized as well as the number of overshot grooves as illustrated in FIG. 7a. In FIG. 7a, each overshot groove has an axial width dimension $Z_G$. All grooves are assumed to be of equal width. Tilted pad bearings are illustrated in FIGS. 6c and 6d. For each tilted pad bearing the information required for the analytical model is (see also Table I) the number of pads, the arc length of a pad assuming all pads in a bearing are identical in length, the pivot position of the pad (0.5 for centrally pivoted pad), Young's modulous for the pivot material, the circumferential radius of a pivot, whether the load is on or between the pads, whether pads are double tilted, for a double tilted pad, the axial radius of pivot, $R_L$ (FIG. 7b'), and for a singe tilted pad, the axial support length $L_P$.

The response information in the analytical model requires for each pedestal and bearing the vertical response for a vertical alignment and the horizontal response for each pedestal and bearing for horizontal alignment. The response is the peak vibration amplitude in a given vertical or horizontal direction and, or, acceleration in that direction. The above information can be gathered and determined in tabular form and collected for each shaft-bearing system being analyzed. This information is then entered into the analytical FEM model for determining the vibration response characteristics of a given shaft-bearing system.

Once a given line-shaft setup has been defined as outlined above then the modeling of that system can be commenced. The analytical model of the dynamic system employs the equation of motion for the shaft-bearing system as given by equation 2 below.

$$M\ddot{x} + C\dot{x} + Kx = F \quad (2)$$

where:
M is the mass matrix for the masses and moments of inertia for all elements of the shaft,
C is the damping matrix for the shaft and bearings,
K is the stiffness matrix for the shaft and bearings,
F is the combined force vector due to unbalance forces and external forces on the shaft and bearings,
x is the linear vibration amplitude vector of a shaft node,
$\dot{x}$ is the time derivative of the dynamic displacement vector of each node, and
$\ddot{x}$ is the second time derivative of the dynamic displacement vector of each node.

To relate static forces at nodes to static displacement at nodes, Castigliano's Theorem is used. Briefly, Castigliano's Theorem is applied to form a matrix Q. This matrix relates static forces and static displacements according to equation 3.

$$Q f = \delta \quad (3)$$

Q is a matrix that relates static displacements at nodes to forces at nodes. f is a vector of forces applied at nodes. δ is a vector of static displacements at nodes. Movement at the bearings, that is static linear displacement of the bearings (or shift in bearing position), can be inputted and equation (3) solved for the force loads at each bearing. These forces are then used to calculate bearing stiffness and damping coefficients.

When the line-shaft is aligned, the linear static displacement at each bearing is zero, that is, $\delta_i=0$ for each bearing. Setting $\delta_i=0$ at the bearings and using equation (3), $f_i$, the forces at the bearings, is determined. Since $f_i$ actually represents the resultant force at bearing i of the line-shaft model, the weight lumped at a node is added to this force to obtain the bearing reactions.

Once the bearing reactions or loads on bearings are known, the bearing stiffness and damping coefficients can be found. The bearing stiffness and damping coefficients are added to matrices formed for the shaft to obtain the global stiffness and damping matrices for the complete shaft-bearing system.

The next procedure is to formulate the mass damping and stiffness matrices for the shaft alone without the bearings. These matrices are formed using the model according to the procedure outlined above in connection with FIG. 5 and standard FEM techniques.

The equation of motion, equation (2), is solved for the value of x letting $x_b$ represent the aligned base vibration response of the rotating shaft-bearing system. That is, x is the value of the linear vibration magnitude of the vibrating system at a given node.

If the aligned bearing-shaft system is available, the model developed above can be refined. Refinement is done by comparing the predicted response $x_b$ at each given node with the actual measured vibration response of the aligned system and the stiffness and damping matrices in the equation of motion, equation (2), modified to make the predicted response closer to the actual response.

In general, at speeds away from resonance, damping has relatively little effects on the response of the system. Therefore, it is at this speed that measurements of displacement are taken to refine the stiffness matrix. For the refinement of the damping matrix, however, measurements are made close to the resonance because damping has significant effect on the response near resonance speeds. The refinement procedure can be summed up in the following four steps:

1. Away from resonance, measure response
2. Refine stiffness matrix
3. Near resonance, measure response
4. Refine damping matrix Once having obtained the base response, that is the value of $x_b$, for an aligned shaft-bearing system, a table is produced that correlates each increment of linear static displacement of a bearing in a given direction, such as a vertical direction 416 FIG. 4, or in a horizontal direction perpendicular to the plane of the sheet of the drawing, to the vibration for each of the bearings. This requires recalculating the vibration response x of the system at each bearing or node, that is, the value of x, for each assumed bearing displacement. Each bearing is displaced a unit amount independently of the other bearings. The calculated response x at each assumed linear static displacement of a bearing is accumulated in a matrix which is stored in the RAM 429 of the computer 428, FIG. 4.

To determine this matrix, each bearing is displaced linearly a unit amount of misalignment. This unit amount of misalignment is analytically inserted in the appropriate place for the vector δ in equation 3. All other values of δ are kept at zero to represent no misalignment at the other bearings. By displacing the bearings this unit amount, the bearing loads are obtained by solving equation 3 for the unknown bearing forces. These forces are the resultant forces on a shaft and must always be added to the lumped weights at the bearing nodes as described above.

Once having obtained the bearing loads, the bearing stiffness and damping coefficients are recalculated. These recalculated bearings stiffness and damping coefficients are added to the stiffness and damping matrices for the shaft to form new global stiffness and damping matrices for the linear static unit displacement of a given bearing. The dynamic force vector F has been formulated and is unchanged. The equation of motion, equation (2), is solved to obtain the response x at the bearing nodes for the assumed unit displacement δ of that given bearing. The response, $x_b$, is subtracted from x and the resultant response at the bearing nodes form one column of a dynamic influence coefficient matrix, D.

Once the linear vibration amplitude response x for the bearing nodes is calculated with each bearing displaced individually a unit static amount, a dynamic influence coefficient matrix D is completed and is stored in the RAM 429. The values of the elements of D form a matrix which remains constant once the matrix is computed for a unit displacement of each bearing. This matrix relates the change in vibration response ($\Delta x$ = misaligned response – aligned response) to the linear static misalignment of the bearings (δ) as follows:

$$D\,\delta = \Delta x \tag{7}$$

Where:
D = the dynamic influence coefficient matrix
δ = the static displacements (misaligned) at bearings, a vector
$\Delta x = x_{misaligned} - x_{aligned}$ (where x is the linear vibration amplitude responses), a vector In completing the dynamic influence coefficient matrix the following procedure in used: x is solved for using the equation of motion for the system as described above for a fully aligned shaft-bearing system. As mentioned, x for an aligned system is referred to as $x_b$. Each bearing, for example bearing 411, 412, . . . $413_n$ FIG. 4, is moved one unit analytically. Having displaced a given bearing a unit static linear displacement magnitude, the procedure returns to equation (3), and the newly obtained loads for all bearings are determined. New coefficients of stiffness and damping matrices are then obtained for all of the bearings. These newly derived coefficient values are placed in the equation of motion (2) and the value of x in the equation of motion representing the dynamic displacement value for a given bearing is solved. This value of x results in a differential change in x from the aligned value $X_b$, $\Delta x$.

The value of δ for each bearing in the matrix D corresponds to the one displaced bearing unit value. A second different bearing is now analytically displaced a unit amount in the same direction as the first bearing and the first bearing is analytically returned to a zero displacement position. New loads are calculated employing Castigliano's Theorem and new coefficients of stiffness and damping obtained for all the bearings. A new $\Delta x$ is obtained as a result of employing these new coefficients in the equation of motion and this $\Delta x$ corresponds to a new value of D for the vector value δ in the column of dynamic influence coefficient matrix values D using equation (7). This procedure is repeated for the entire system for a unit displacement of each bearing until the entire matrix D is completed.

The resulting matrix D for the values of δ correspond and correlate to the degree or magnitude of change in the linear vibration displacement value of x due to the unit movement of each bearing. That is, the value of δ times a given value in the matrix D produces a corresponding vector response change in the value of x of the vibrations at the bearings. The resulting matrix D represents constant value information which is used to compute the value of δ displacement misalignment for each bearing employing the measured value of x from a rotating shaft. It should be understood that the vibration responses x of all of the bearings in the system as the shaft rotates are used to compute the linear static displacement of each of the bearings in the system using D and the value of x in an aligned system.

The equation 7 assumes superposition is valid. That is, assume two different bearings displace a static displacement a unit value each causing a resultant combined corresponding vibration response at each bearing. Assume the same two bearings were displaced separately. The summation of their vibration responses would be the same as the vibration responses caused by the concurrent displacements.

Once the dynamic influence coefficient matrix D is completed, a constant for a unit displacement, the information is incorporated in the RAM 429, which is loaded by a disc. The RAM may have the matrix D values stored at different memory addresses. The vibration responses from each accelerometer would then be processed by switching system 426. System 426 may convert the output voltages of the accelerometers into linear displacement signal values, perform filtering and time averaging to improve the signal-to-noise ratio of the signals. These signals, on command from the computer 428 are then used by the computer to compute δ for each bearing employing equation 7.

In equation 7, the newly acquired values of x of a misaligned shaft is subtracted from the values of x for the aligned system for that bearing. Then using the matrix D, δ, the static displacement of each bearing is computed. This procedure may be periodically updated in a given time period to allow for periodic changes in the vibration responses. The procedure for deriving the matrix D is completed once for a particular line-shaft configuration.

Preferably accelerometers are employed because they are relatively small, easy to mount and available commercially. The accelerometers are secured directly to each of the bearing pedestals, one accelerometer for each bearing. Since accelerometers actually measure accelerations, the signal is integrated twice to obtain displacement.

It is a simple matter then to calculate the requirements to realign the shaft of the system based on the values of δ computed from the matched measured linear vibration response amplitudes at each of the bearings. The following relationship represents the resulting shimming requirements at each bearing to achieve alignment:

$$s = -\delta \qquad (8)$$

In this equation δ represents the computed static displacement value of each bearing based on the inputted vibration response amplitudes from the accelerometers. The term s represents the shimming requirements at each bearing to achieve alignment.

The flow chart of FIG. 8 illustrates generally the procedure employed in the above described sequence of steps. In the flow chart, if the line-shaft setup is defined, the next step is to determine whether or not the aligned response has been stored in the system. If the analytical model has previously been employed to determine the aligned response or the aligned response has been measured from a given rotating shaft-bearing system, then the next step would be to initiate data collection and analysis employing the system of FIG. 4. The system of FIG. 4 will then display on printer 430 or the video display terminal 432, the shimming requirements of each bearing in accordance with the computed results based on the measured responses outputted by each of the accelerometers. The more specific flow chart of the FIG. 9 illustrates the various procedural steps described above in the desired sequence.

In use, the system is activated to receive the vibration responses from the accelerometers attached to each of the bearing pedestals. The system automatically uses the measured vibration responses to produce the shimming requirements for each bearing pedestal. Since a signal conditioning and switching system, computer, and display monitor may be kept on board a ship and attached permanently to the accelerometers which may be attached permanently to the shaft-bearing system, whenever it is desired to determine the amount of displacement of a given bearing, the system may be activated and the shimming displacement for each bearing read. The actual displacement value for each bearing may fall within a threshold range predetermined as critical for a given bearing for which shimming is required. If the read shimming requirement or static displacement value for a given bearing exceeds a given predetermined threshold value, then the operator of the ship knows that the particular bearing system needs to be realigned and knows the actual values of shimming required. The system can then be temporarily shut down and realigned.

What is claimed is:

1. Apparatus for determining the magnitude of static linear displacement of a rotating shaft from an aligned reference position at each respective one of a plurality of bearings supporting said shaft, said shaft tending to vibrate differently than when aligned due to said static displacement at least one of said bearings, said apparatus comprising:

means for determining at each of said bearings the linear vibration amplitude of said shaft caused by said static displacement of said shaft from at least one of said reference positions;

means responsive to said means for determining for producing an indication representing the magnitude of said static displacement of each said bearings from said aligned reference position which displacement corresponds to and is the cause of the determined linear vibration amplitude at each of said bearings; and means for shimming each of said bearings in accordance with the magnitude of said static displacement of each said bearing, an amount of shimming for each respective bearing being substantially equal to and opposite from said static displacement at each respective bearing.

2. The apparatus of claim 1 wherein said shaft has a plurality of nodes, said means for producing an indication including means for determining the value of said static linear displacement having a magnitude δ according to the relationships:

$$M\ddot{x} + C\dot{x} + Kx = F \quad (a)$$

where:
- M is the mass matrix for the masses and moments of inertia for all elements of the shaft,
- C is the damping matrix for the shaft and bearings,
- K is the stiffness matrix for the shaft and bearings,
- F is the combined force vector due to unbalance forces and external forces on the shaft and bearings,
- x is the linear vibration amplitude vector of a shaft node,
- $\dot{x}$ is the time derivative of the dynamic displacement vector of each node,
- $\ddot{x}$ is the second time derivative of the dynamic displacement vector of each node; and $$D\delta = \Delta x \quad (b)$$

where:
- D is a matrix of calculated values based on assumed values of δ which cause changes in the calculated values of x according to equation (a) for all nodes and wherein δ is initially a set of assumed static linear displacements of each bearing from its reference position used to calculate D;
- Δx is the calculated difference in value between a reference value of x for an aligned shaft at a given bearing and the resultant measured value of a changed x caused by a misaligned displaced shaft; and wherein:
- δ is the computed value of the produced indication which is the actual determined static misaligned linear displacement value of the bearings computed from each resulting measured value of x of a rotating misaligned shaft and the calculated value of D.

3. The apparatus of claim 1 wherein said means for determining includes signal generating means coupled to each said bearings for generating a signal manifesting said linear vibration amplitude of each said bearings and said means for producing an indication includes computer means responsive to said generated signals for producing a set of output signals each of which manifests said static linear displacement of said shaft at each said bearings.

4. The apparatus of claim 3 wherein said signal generating means include an accelerometer coupled to each said bearings.

5. Apparatus for determining the magnitude of static displacement of a rotating shaft from an aligned reference position at each respective one of a plurality of bearings supporting said shaft, said shaft tending to vibrate differently than when aligned due to said static displacement at at least one of said bearings, said apparatus comprising:
- memory means for storing a reference linear vibration amplitude value of said shaft at each said bearings when said shaft is aligned;
- means for measuring at each said bearings the linear vibration amplitude of said shaft caused by said shaft being statically displaced from said aligned reference position at at least one of said bearings;
- computer means for producing from said stored reference linear vibration amplitude value and from said measured vibration amplitude value at each said bearings a difference signal for each said bearing which difference signal manifests the magnitude of linear static displacement of each said bearing from its aligned reference position; and
- shimming means for shimming each said bearing in accordance with the magnitude of said linear static displacement of each said bearing, an amount of shimming for each respective bearing being substantially equal to and opposite from said static displacement at each respective bearing.

6. The apparatus of claim 5 wherein said computer means includes means for computing the value of δ corresponding to a measured vibration amplitude x where:

$$D\delta = \Delta x;$$

and
where D is a matrix of values which correspond to changes in the value of x for all bearings; δ is the computed unit static linear displacement value of each bearing from its reference position; and Δx is the difference in value between a reference value of x for an aligned shaft at a given bearing and the resultant value of a measured changed x which is used to compute each value of δ.

7. A method for determining the magnitude of static displacement of a rotating shaft from an aligned reference position at each respective one of a plurality of bearings supporting said shaft, said shaft tending to vibrate due to said static displacement at at least one of said bearings, said method comprising:
- determining at each of said bearings the linear vibration amplitude of said shaft caused by said static displacement of said shaft from at least one of said reference positions;
- producing in response to said determined vibration amplitude an indication representing the magnitude of said static displacement of each said bearings from said aligned reference position which displacement corresponds to and is the cause of the determined linear vibration amplitude at each of said bearings; and
- shimming each said bearing in accordance with the magnitude of said static displacement of each said bearing, an amount of shimming for each respective bearing being substantially equal to and opposite from said static displacement at each respective bearing.

8. The method of claim 7 wherein said shaft has a plurality of nodes, said step for producing an indication including the step of determining the value of said static displacement having a magnitude δ according to the relationships:

$$M\ddot{x} + C\dot{x} + Kx = F \quad (a)$$

where:
- M is the mass matrix for the masses and moments of inertia for all elements of the shaft,
- C is the damping matrix for the shaft and bearings,
- K is the stiffness matrix for the shaft and bearings,
- F is the combined force vector due to unbalance forces and external forces on the shaft and bearings, x is the linear vibration amplitude vector of a shaft node, $\dot{x}$ is the time derivative of the dynamic displacement vector of each node, $\ddot{x}$ is the second time derivative of the dynamic displacement vector of each node; and $$D \delta = \Delta x \qquad (b)$$

where:

D is a matrix of calculated values based on assumed values of δ which cause changes in the calculated values of x according to equation (a) for all nodes and wherein δ is initially a set of assumed static linear displacements of each bearing from its reference position used to calculate D;

Δx is the calculated difference in value between a reference value of x for an aligned shaft at a given bearing and the resultant measured value of a changed x caused by a misaligned displaced shaft; and wherein:

δ is the computed value of the produced indication which is the actual determined static misaligned linear displacement value of the bearings computed from each resulting measured value of x of a rotating misaligned shaft and the calculated value of D.

9. The method of claim 8 wherein said producing step includes, for each value of C and K, the step of assuming a unit static linear displacement at each bearing and, using such assumed static linear displacement, computing the forces at each node according to Castigliano's Theorem:

$$Q f = \delta \qquad (c)$$

where:

Q is a matrix that relates unit static displacements at nodes to forces at nodes, f is a vector of forces applied at nodes, and δ is a vector of static displacements at nodes; and then computing the damping and stiffness matrices C and K for the bearings and shafts for use in equation (a) using the forces determined from equation (c).

10. A method for determining the magnitude of static displacement of a rotating shaft from an aligned reference position at each respective one of a plurality of bearings supporting said shaft, said shaft tending to vibrate due to said static displacement at at least one of said bearings, said method comprising:

determining the linear vibration displacement value of each bearing for the aligned shaft-bearing system;

creating a matrix of dynamic influence coefficient values for a misaligned shaft-bearing system wherein each bearing is misaligned a unit displacement value, said matrix of values being calculated from said unit displacement values which correspond to a set of calculated vibration response values based on the unit displacement values;

measuring the actual linear dynamic vibration displacement value of each bearing;

determining the linear static displacement value for each said bearings from (1) the measured linear dynamic displacement values; (2) the determined vibration displacement value of an aligned system; and (3) the created matrix of dynamic influence coefficient values; and shimming each said bearing in accordance with the magnitude of said static displacement of each said bearing, an amount of shimming for each respective bearing being substantially equal to and opposite from said static displacement at each respective bearing.

11. The method of claim 10 wherein said determining the linear static displacement step includes:

determining the force load at each bearing for said aligned shaft;

using said determined force load to determine the bearing stiffness and damping coefficients for said aligned bearing-shaft system; and determining the force vector for the aligned shaft and bearing system.

12. The method of claim 10 wherein said creating a matrix of coefficient values step includes determining the bearing force loads at each bearing when each said bearing is displaced said assumed linear static displacement values and redetermining the bearing stiffness and damping coefficients for the misaligned bearing-shaft system and, employing said determined force load at each said bearing, solving said equation of motion to determine said linear vibration response values in each said bearing to form said matix of values which correspond to the linear static bearing displacement values related to the measured linear vibration displacement values.

* * * * *